(12) United States Patent
Hirt et al.

(10) Patent No.: US 7,727,300 B1
(45) Date of Patent: Jun. 1, 2010

(54) POLYMERIC STRUCTURES WITH PATTERNED REACTIVITY

(75) Inventors: Douglas E. Hirt, Seneca, SC (US); Scott M. Husson, Greenville, SC (US); Keisha B. Walters, Starkville, MS (US); Chun Zhang, Clemson, SC (US)

(73) Assignee: Clemson University

( * ) Notice: Subject to any disclaimer, the term of this patent is extended or adjusted under 35 U.S.C. 154(b) by 790 days.

(21) Appl. No.: 11/585,664

(22) Filed: Oct. 24, 2006

Related U.S. Application Data

(60) Provisional application No. 60/729,620, filed on Oct. 24, 2005.

(51) Int. Cl.
*B01D 50/00* (2006.01)
(52) U.S. Cl. .......................... 55/524; 55/528
(58) Field of Classification Search .................. 55/524, 55/527, 528; 96/108; 428/58
See application file for complete search history.

(56) References Cited

U.S. PATENT DOCUMENTS

| | | | |
|---|---|---|---|
| 3,565,985 A | 2/1971 | Schrenk et al. | |
| 3,741,253 A | 6/1973 | Brax et al. | |
| 4,399,181 A | 8/1983 | Yoshimura et al. | |
| 4,442,147 A | 4/1984 | Schirmer | |
| 4,599,276 A | 7/1986 | Martini | |
| 4,755,436 A | 7/1988 | Garland | |
| 5,269,995 A | 12/1993 | Ramanathan et al. | |
| 6,025,079 A | 2/2000 | Ciocca et al. | |
| 6,101,032 A | 8/2000 | Wortman et al. | |
| 6,124,971 A | 9/2000 | Ouderkirk et al. | |
| 6,613,411 B2 | 9/2003 | Kollaja | |
| 6,680,114 B2 | 1/2004 | Kody et al. | |
| 6,777,056 B1 * | 8/2004 | Boggs et al. | 428/58 |
| 6,824,849 B2 | 11/2004 | Herzog et al. | |
| 6,893,705 B2 | 5/2005 | Thomas et al. | |

* cited by examiner

*Primary Examiner*—Robert A Hopkins
(74) *Attorney, Agent, or Firm*—Dority & Manning, P.A.

(57) ABSTRACT

Disclosed are polymeric constructs that can advantageously be utilized in a wide variety of fluid contact devices. The constructs include two or more polymeric materials, at least one of which includes reactive functionality so as to preferentially interact with an analyte of interest. The polymeric constructs include the reactive materials in discrete areas of the devices, so as to provide the reactive functionality in a patterned array across a fluid contacting surface of the device. The reactive functionality can be provided in a macro-, a micro-, or a nano-patterned array, depending upon the specific parameters of the formation process. The devices can be utilized in separation protocols as well as other applications involving controlled fluid flow across a reactive surface.

24 Claims, 4 Drawing Sheets

POLYMERIC STRUCTURES WITH PATTERNED REACTIVITY

CROSS REFERENCE TO RELATED APPLICATIONS

The present application claims filing benefit of U.S. provisional patent application Ser. No. 60/729,620 filed on Oct. 24, 2005, which is hereby incorporated by reference in its entirety.

STATEMENT REGARDING FEDERALLY SPONSORED RESEARCH OR DEVELOPMENT

The U.S. Government may have the right in limited circumstances to require the patent owner to license others on reasonable terms as provided for by the terms of Grant No. EED-9731680 awarded by the National Science Foundation.

BACKGROUND

Materials for use in separations and other techniques involving fluid contact are often expensive and usually offer little in the way of adaptability, in particular in regard to geometry of the devices. For instance, the materials themselves, e.g., the column or substrate material defining the fluid contact surfaces of the device, are usually formed to a predetermined geometry that offer no adaptability to the user, and as such the user must adapt their protocol to be compatible with the available separation materials, rather than the other way around.

Moreover, while advances have been made in methods of forming functional materials as can be utilized in such devices in a micro-patterned array, for instance via masking methodologies, utilization of self-assembled monolayers, and the like, nano-patterning of materials remains difficult and expensive. For instance, periodic arrays on a nanometer scale have been constructed for use as separation media by optical microlithography techniques, as described by Vokmuth, et al. ("DNA electrophoresis in microlithographic arrays," Nature 358:600 (1992)). In other research, block copolymers have been examined as a possible class of materials suitable for forming patterned arrays on a nanometer scale. For example, block copolymers have been developed having characteristics to enable either the self-assembly or the controlled formation of the polymer such that different domains of the copolymer form nanoscopic patterns and/or structures upon crystallization or solidification (see, for example, U.S. Pat. No. 6,893,705 to Thomas, et al.).

What is needed in the art are economical materials suitable for fluid contact applications that can include desired chemistries in micro- or nano-patterned orientations. In addition, what is needed in the art are devices including predetermined surface chemistries that are more user-friendly and easily adapted to meet the specific needs of consumers wishing to utilize the materials.

SUMMARY

In one embodiment, disclosed is a separation device comprising a melt processed composite structure. A composite structure can include a surface for contacting a fluid. The surface can define a first discrete area that includes a first polymeric material. In addition, the first polymeric material can include a first functional chemistry. The surface can also define a second discrete area that includes a second polymeric material. In one embodiment, the second discrete area can also include a functional chemistry, different from the first functional chemistry.

The first and second polymeric materials can include compatible polymers. For example, the two materials can include a first and second polymer, respectively, that can share a monomeric component of the polymers. For example, the first polymer can be a homopolymer and the second polymer can be a copolymer, and the two can share a monomeric component.

The discrete areas of the contact surface can be quite small. For instance, the first discrete area can have a surface area dimension of less than about 500 micrometers, or smaller yet, in other embodiments, for instance, smaller than about 100 micrometers, smaller than about 50 micrometers, or smaller than about 10 micrometers. In another embodiment, a dimension of the first discrete area can be in the nanometer range, i.e., less than one micrometer.

A composite structure can be a multi-layer film, a fiber, a multi-filament fiber or yarn, and the like. For example, the first discrete area of a multi-layer film composite structure can be a surface of a first layer of the film and the second discrete area of a multi-layer composite structure can be a surface of a second layer of the film.

In another embodiment, a composite structure can include a plurality of films in a stacked arrangement. In such an embodiment, the individual layers of the composite can be formed as either multi-layer films or single layer films.

A contact surface of a separation device can include a plurality of discrete areas. For instance a plurality of discrete areas on a contact surface can each include the first polymeric material. In one embodiment, a plurality of discrete areas can form a pattern on a surface, for example, through variation of surface/flow characteristics of the first and second polymeric materials, a pattern of discrete areas on a contact surface can form a flow pattern for a fluid on the surface.

A composite structure of a disclosed separation device can have any predetermined geometry. For instance, a composite structure as described herein can be flexible and formed to any suitable geometry.

Also disclosed are methods for binding a compound to a contact surface as disclosed herein. For example, upon contact of a fluid with a contact surface, the compound can preferentially bind to the first discrete area of the surface.

Compounds that can be separated from a fluid (e.g., a liquid, a vapor, or a gas) can include molecular compounds, such as environmental toxins, e.g., perchlorate ion and the like, biomolecular compounds, e.g., antigens, antibodies, and the like, including biomolecular compounds at the surface of a living cell. According to this embodiment, a living cell can bound to the surface via the first functional chemistry.

In another embodiment, a functional chemistry of one area can repel a compound and direct the compound to the second discrete area where it can bind.

The first functional chemistry as formed can be further derivatized, in one embodiment. For example, a member of a specific binding pair can be bound to the surface at the first functional chemistry and the compound of interest can include the second member of the specific binding pair.

BRIEF DESCRIPTION OF THE DRAWINGS

A full and enabling disclosure of the disclosed subject matter, including the best mode, to one of ordinary skill in the art, is set forth more particularly in the remainder of the specification, including reference to the accompanying figures, in which.

Figure 1:
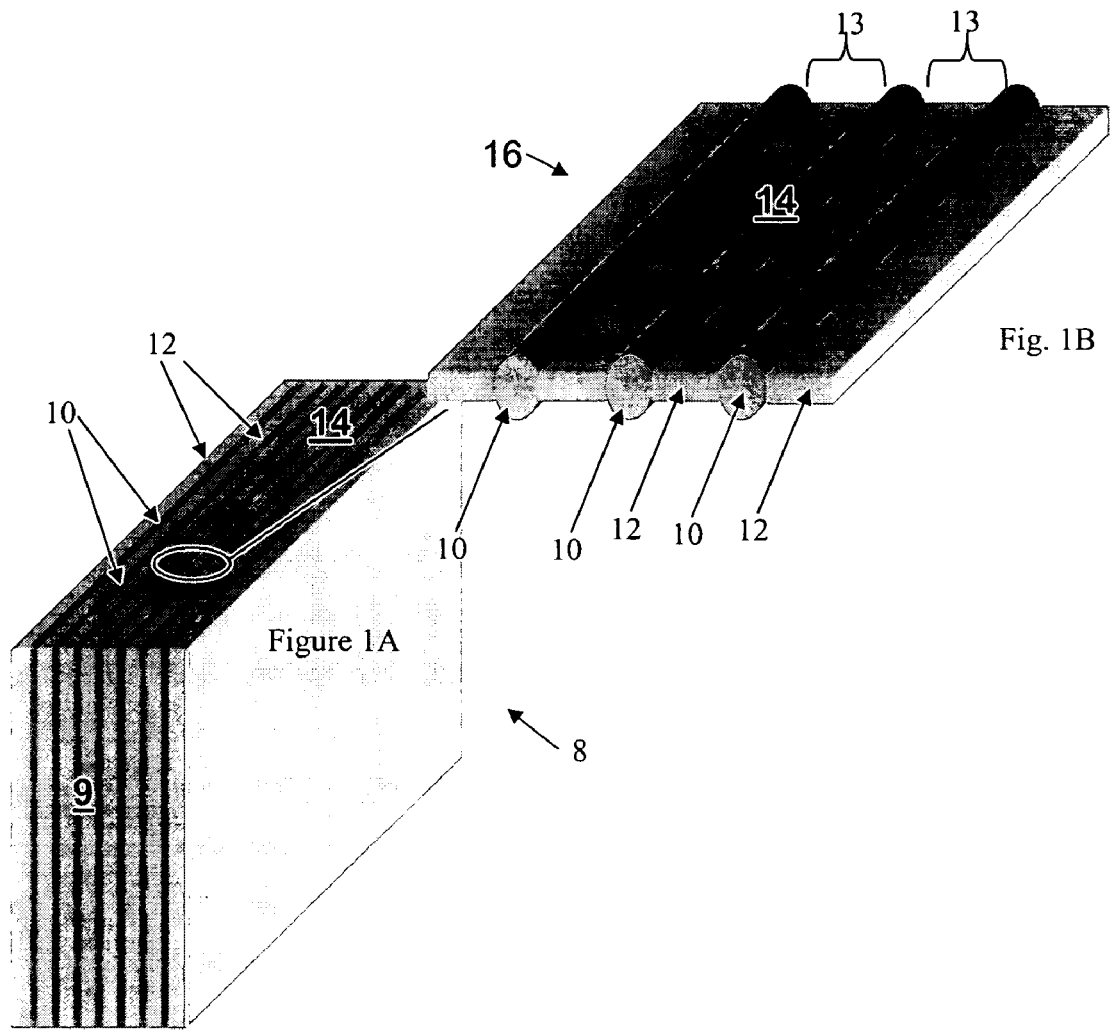
FIG. 1A is a schematic representation of a multilayer film as disclosed herein.
FIG. 1B is a schematic representation of a single microtomed cross section of the film of FIG. 1.

Repeat use of reference characters in the present specification and drawings is intended to represent the same or analogous features or elements.

DETAILED DESCRIPTION

Reference will now be made in detail to various embodiments of the disclosed subject matter, one or more examples of which are set forth below. Each embodiment is provided by way of explanation, not limitation. In fact, it will be apparent to those skilled in the art that various modifications and variations may be made without departing from the scope or spirit of the disclosure. For instance, features illustrated or described as part of one embodiment, may be used in another embodiment to yield a still further embodiment.

The present disclosure is generally directed to devices that can be beneficially utilized in a variety of applications in which a fluid can flow across, over or through a device. For example, a device as disclosed herein can be utilized in separation applications, e.g., chemical detection and analyte concentration protocols, as well as in other applications. Fluid flow across and fluid contact with a surface of a device as herein presented can be controlled on a macro-, micro- or nano-scale. Thus, applications can include directed material growth applications, flow control in microfluidics devices, and the like.

Presently disclosed devices can include one or more functional chemistries in discrete areas. The discrete areas can form a pattern across a fluid contacting surface of a device. For instance, a device can include two or more polymeric materials, each exhibiting different functional chemistry and different reactivity to various analytes, and these polymeric materials can be located in discrete areas of a device so as to define a pattern across a fluid contacting surface of the device. In various embodiments, individual elements of a pattern can be formed with dimensions on the order of micrometers or even nanometers. In one embodiment, a device can be flexible, so as to be easily adaptable to any desired geometry. Accordingly, a device as herein described can include one or more desired chemistries in macro-, micro- or nano-patterned arrays and can have a modifiable, e.g., bendable or otherwise formable geometry. Moreover, a device as described herein can have a large contact surface area for interaction with a fluid.

Also disclosed are methods that can be used to form and use such a device. In general, disclosed methods can include providing a composite structure including two or more different polymeric materials in discrete locations of the composite, with at least one of the polymeric materials including reactive functionality. A composite structure can be further processed as desired to form a device with the desired surface chemistry, geometry, fluid contact surface area, etc.

In one particular embodiment, a polymeric composite (i.e., a composite structure including two or more materials, at least one of which is polymeric) can be a multilayered composite structure that can include different polymeric materials in adjacent layers. In one preferred embodiment, a composite structure can be a polymeric composite structure such as a multilayered film, for example a melt-processed extruded film including different polymeric materials in adjacent layers that can be extruded in a single formation process or alternately extruded as separate films and then layered following initial film formation. This is not a requirement, however, and though the present discussion is generally directed toward the formation of multilayered composite polymeric films, in other embodiments, a composite structure need not be a film, or even multilayered. For instance, in another embodiment a composite structure can be a composite polymeric fiber including different polymeric materials in concentric layers or in an "islands in the sea" arrangement, so as to form a composite fiber. In another embodiment, a composite can include multiple adjacent filaments each formed of a different polymeric material that can be combined in a multifilament fiber or yarn.

Polymeric materials of a composite can differ from one another at least by the presence of different reactive functionalities on the polymers of the materials, though the polymeric materials may differ from one another in additional aspects as well. In particular, at least one of the polymeric materials can include a reactive functionality. For example, a polymeric material of a composite can include reactive functional chemistry on a polymeric material, for instance in either the backbone or as a pendant group of a polymer. Such functionality can be useful either directly, i.e., as formed on the polymer, or optionally, can be further derivatized for a particular use. For example, the polymeric material can be further treated to provide a particular chemistry via the reactive functionality. A reactive functionality can be located at a fluid contact surface of a device. The particular surface chemistry to be formed, bound, or otherwise provided can be selected to be reactive to a specific analyte or class of materials specific to the application.

A polymeric material of a composite can include any suitable reactive functional chemistry, e.g., epoxy, acrylate, hydroxyl, carboxyl, amine, amide, sulfide, unsaturated carbons, acid halide, halogen, and the like that can serve, either directly or through a secondary derivatization, as a recognition site for an analyte in a desired application.

While adjacent polymeric materials of a composite can include different reactive functionality, adjacent materials can be physically compatible with one another. In one embodiment, different polymeric materials of adjacent areas can exhibit good adhesion properties with regard to one another, but can remain in discrete locations upon formation of a composite structure.

In one embodiment, different polymeric materials of a composite can include polymers that have at least one backbone monomer in common. For example, a first polymeric material can include a first polyolefin homopolymer, such as a polyethylene homopolymer, a polypropylene homopolymer, or the like, and a second polymeric material forming a second area of a composite can include a second polymer that is more reactive, but this second polymer can include a monomeric component in common with the first polymer. For instance, the second polymer can include the same olefin backbone as is found in the first polymer, but can also include a more reactive functional chemistry in either the backbone or as a pendant moiety. For example, the first polymeric material can include a polyolefin homopolymer and the second polymeric material can include a polyolefin/acrylic acid copolymer. The ratio of the two monomers on a copolymer can be in any range as long as the compatibility of the first and second polymeric materials of the composite is not destroyed and the second polymeric material exhibits the desired reactivity. For example, a copolymer can include an olefin component and a reactive component in a ratio of between about 100:1 and about 1:100.

In one embodiment, polymers for use in a polymeric material of a composite can include any polymer that is capable of being melt processed. Any particular polymer can be selected for various reasons such as ease of processing, cost, or ease of copolymerization with a reactive functionality as may be desired for a particular application of a composite structure and device. For instance, one or more polymeric materials of a composite, either a reactive or non-reactive polymeric material, can provide to a composite one or more desired properties such as strength, modulus, puncture resistance, breathability, and the like.

A polymeric material of a composite can include additional materials, for instance additional polymers in a polymer blend or one or more additives, provided the additional materials do not interfere with the compatibility of the polymeric materials of the composite or the desired fluid contact characteristics of the structure. For example, a polymeric material can include coloring agents, such as dyes or other pigments. Other additives that can be added to a polymeric material can include, for example, one or more of anti-static agents, antioxidant agents, antimicrobial agents, adhesion agents, stabilizers, plasticizers, brightening compounds, clarifying agents, ultraviolet light stabilizing agents, nucleating agents, surface active agents, odor enhancing or preventative agents, light scattering agents, halogen scavengers, and the like.

In one embodiment, additives that can be included in a polymeric material of a composite can further enhance particular fluid contact characteristics of the material. For example, hydrophilic or hydrophobic additives can be included to alter the wetting characteristics of a material. Optionally, additives can be added that can be migratory within the material. For example, following formation, an additive can migrate to an air surface to enhance or alter surface characteristics of a composite.

An additive can be included in a composite as an intervening layer between adjacent polymeric materials. For example, a layer that can improve adhesion or compatibility of two adjacent polymeric materials can be included in a composite. Any suitable additive can be included, provided it does not interfere with the desired fluid contact characteristics of the device formed from the composite. Such a layer can be polymeric, though this is not a requirement.

In one preferred embodiment, two or more polymeric materials as described herein can be combined to form a multilayer film. For example, FIG. 1A is a schematic representation of one embodiment of a multilayer film including a first polymeric material forming a first layer 10 in an alternating arrangement with a second polymeric material forming a second layer 12. A 1:1 alternating arrangement of the different polymeric materials is not a requirement, and in other embodiments, a multilayer film can include the different polymeric materials in a different arrangement, for instance two or more layers of a first material adjacent to one or more layers of the second material. Moreover, a multilayer composite structure is not limited to two polymeric materials, and other polymeric materials with other functional chemistries, other additives, etc. can be included in a composite.

Several different methods for forming multilayer films that include individual layers formed of different materials are generally known to those of skill in the art and multilayer films can be produced using extrusion techniques and equipment as is generally known to the skilled artisan. For example, a multilayer film can be formed using two or more extruders, a die with several concentric annular extrusion slots, bubble stretching apparatus and/or longitudinal stretching or drawing apparatus, all of which are generally known in the art. For instance, single layer polymeric films can be formed according to known extrusion processes and then, following initial formation, the individual films can be layered together, for instance in an alternating arrangement according to materials, to form a multilayer composite structure. In another embodiment, polymeric materials that form the individual layers can be separately prepared and processed in different extruders and then passed to the corresponding extrusion slots of a single die. Generally, the die slots can be very close to each other in such an embodiment and the emerging forms that can become the individual layers of a multilayer film can contact one another within the die or soon after emerging from the die. Following contact, a composite structure can be stretched and oriented. According to this particular embodiment, individual layers will not be independently stretched and oriented. As such, all of the layers of the extruded film will have the same direction of orientation.

In another embodiment, a multi-layer film can be formed to have a different orientation distribution between film layers. For example, an interior layer of an extruded structure can be predominantly oriented in the longitudinal direction and an exterior layer of the extruded structure can be predominately transversely oriented.

In yet another embodiment, a multilayer film can include microlayers. For purposes of the present disclosure, a microlayer film is herein defined as multilayer films that have layers so thin that in certain embodiments they may be referred to as blends. Microlayer films can be co-extruded using known dies (e.g., annular dies or slit dies) that can produce layer dimensions down to a few hundred angstroms, however any method for forming a microlayer film as is generally known in the art can optionally be utilized. According to many co-extrusion methods for forming microlayer films, multiple streams of the polymeric materials that will form the individual layers can be divided to flow through a modular feedblock, which may be further divided into substreams and re-combined into a composite stream that passes through an extrusion die to form a microlayer film in which each very thin layer is generally parallel to the major surfaces of adjacent layers. Examples of microlayer film constructions and methods for preparing microlayer films are described, for example, U.S. Pat. Nos. 5,269,995 to Ramanathan, et al., 6,124,971 to Ouderkirk, et al., and 6,101,032 to Wortman, et al., all of which are incorporated herein by reference.

Microlayer film structures and technology relating to the production of microlayer films is well documented and widely practiced. Examples of descriptions useful to prepare microlayer films include U.S. Pat. No. 3,365,985 to Schrenk, which describes several feedblock methods for making microlayer films; Schrenk and Alfrey, Polymer Blends vol. 2, chapter 15, Coextruded Multi-layer Polymer Films and Sheets, 1978 Academic Press, ISBN-0-12-546802-4, describing co-extrusion; and Tokshitaka, Campbell, Hasner, Film Processing, 1999, ISBN 1-56990-252-6, describing multi-layer extrusion and useful equipment, all of which are incorporated herein by reference.

In general, the thickness of an individual layer of a multilayer film, whether a microlayer film or a macrolayer film, as well as the total thickness of a composite film can be any thickness that can be processed to form a device as described herein. Preferred thickness of individual layers as well as a composite structure can generally depend upon the application of the finished structure, and is limited only by practical limitations of processing, such as maximum or minimum thicknesses that can be cast or calendered. For example, in one embodiment, a single layer of a multilayer composite film can have a thickness following formation, including any post-extrusion processing, of between about 20 nanometers and about 500 microns.

A multilayer film of a composite structure can have any number of layers. For example, multilayer films having as few as about 5 individual layers can be utilized to form a flow device. In other embodiments, however, a multilayer film can have hundreds or even thousands of layers, for instance up to about 50,000 layers. In addition, a multilayer film can include layers formed of different materials and/or to different thicknesses. For instance, the films can include one or more skin layers that are at only the exterior surface of the film to ease processability and handling, and the interior layers can be formed to different specifications including material specifications, physical specifications, and any combination thereof.

Following formation of a composite structure, the composite can be used as formed as a fluid contact device or can be further processed to form a device. Referring again to FIG. 1A, as can be seen, the illustrated composite 8 includes a surface 14 and a surface 9 both of which include discrete areas of different polymeric materials 10, 12. One or both of surface 14 and surface 9 of the illustrated composite 8 can form a fluid contacting surface as disclosed herein.

In one embodiment, a large structure 8 such as that illustrated in FIG. 1A, can be further processed prior to use. For instance a composite structure 8 can be sliced or cut to form a single section 16, as shown in FIG. 1B. This section 16 can include discrete areas of the different polymeric materials 10, 12 across the surface 14 of the section 16. Thus, the upper surface 14 of the section 16 as well as the opposite, lower surface (not shown) of the section 16 can include surface chemistry in one or both of the discrete areas formed by the polymeric materials 10, 12 that can be specifically designed for interaction with an analyte in a fluid sample. Moreover, a functional chemistry can be confined within discrete areas of the contact surface, e.g., as a reactive functionality existing on one polymeric material 10, but not on the adjacent polymeric material 12. Optionally, a surface chemistry can be provided across a single discrete area or across the entire surface in an uneven manner, for instance with a concentration gradient across a single discrete area and/or across the entire surface 14.

The preferred thickness and/or shape of a section 16 can generally depend upon the final application of the finished device, and is generally limited only by practical limitations of processing, such as a minimum thickness that can be microtomed, possible angles of a cut, and possible surface geometries attainable with a cut. For example, in one embodiment, a cut can be a generally planar cut in relation to a surface 14 of a composite structure and an individual section 16 can have a width of any desired thickness, down to just a few (e.g., 4 or 5) microns. In another embodiment, the thickness of a section 16 can be quite large.

The polymeric materials forming adjacent areas of a device can exhibit a physical response to the formation processes. For instance, a first polymeric material of a composite structure can exhibit a physical response (expansion, contraction, etc.) to a formation step (cutting, heating, shaping, etc.) that is different than that of a second polymeric material of the composite. This difference in response can also be utilized to affect the flow characteristics of the formed devices.

For example, and with reference to FIG. 1B, upon microtoming a section 16 from a larger composite structure 8, a first polymeric material 10 can expand due to changes in surface tension or differences in elasticity at the surface 14. The second polymeric material 12, can exhibit different response to the cutting process. For example, the second polymeric 12, may not expand. Accordingly, a series of channels 13 can form across the surface 14. Thus, flow can preferentially be controlled by the presence of the channels 13. Any suitable pattern can be formed and flow characteristics can be controlled through predetermination of a pattern or patterns formed over a fluid contact surfaces of a device.

Figure 2:
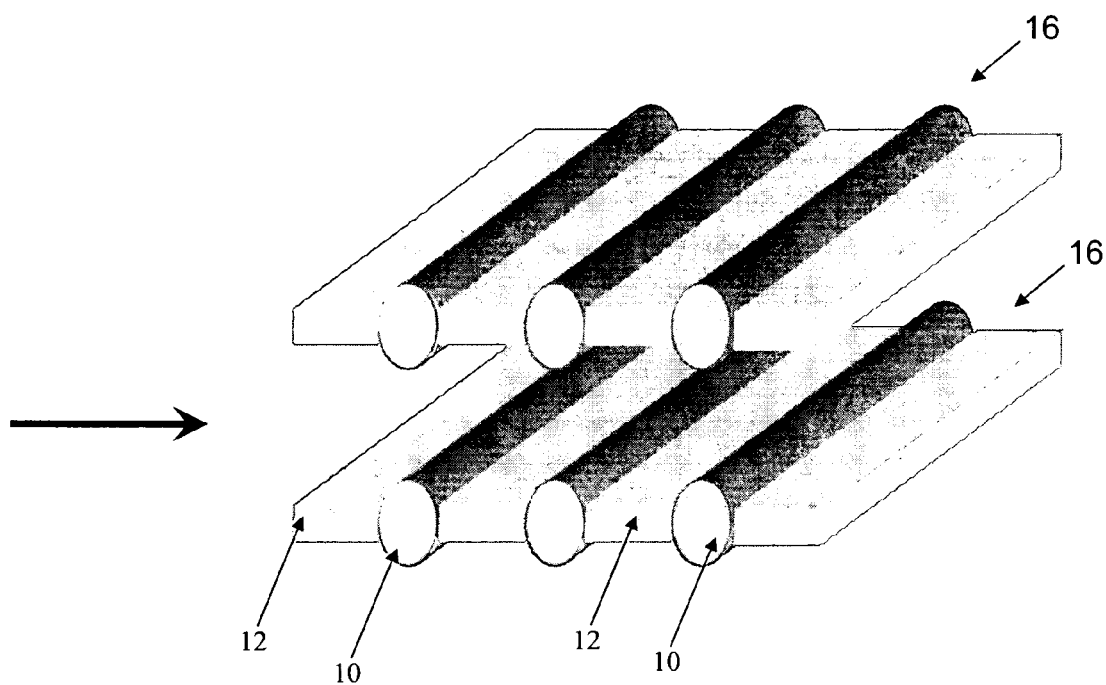
FIG. 2 is an exploded schematic representation of two layers of a multilayered device as disclosed herein.

In one embodiment, a device can include a very high contact surface area. For example, in the embodiment schematically illustrated in FIG. 2, a plurality of individual sections 16 can be combined in a stacked arrangement that can allow fluid contact across and between each of the individual sections 16. The stacked sections can be identical to one another or can differ from one another. For example, sections can be formed of the same materials, but can include the materials in different patterns. In another embodiment, different sections can be formed of different materials including, for instance, different reactivities, different flow patterns, and the like.

Figure 3:
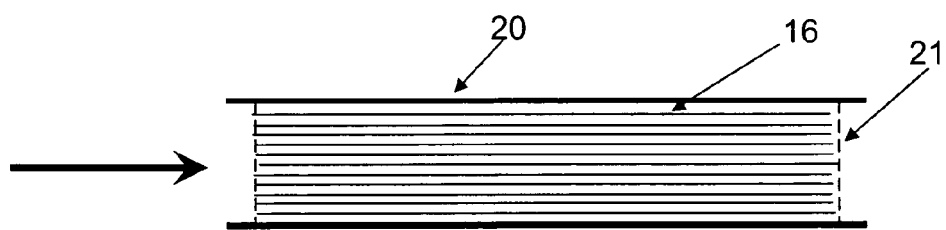
FIG. 3 is a schematic diagram of one embodiment of a device as described herein.

A plurality of individual sections can contact a fluid according to any suitable method. For instance, a plurality of sections can be stacked and held in a housing, e.g., a polymeric or metal housing, with a suitable adhesive and/or through utilization of physical spacers at a wall of the housing, and fluid can flow through the housing to access the fluid contact surfaces of the sections. The individual sections need not necessarily be adhered to the walls of a housing, however. For instance, and with reference to FIG. 3, a plurality individual sections 16 can be stacked within a housing 20 that can include a flow plate 21 at one or both ends of the housing 20. The flow plate 21 can allow fluid to pass, but can prevent sections 16 from escape. As fluid (designated by the arrow) passes through the housing 20, it can pass between the individual sections 16 and contact the functional chemistries of the discrete areas of the sections.

In one embodiment, a fluid-contact device including one or more individual composite structures can be formed with a predetermined macroscopic geometry. For instance, either prior or subsequent to the formation of individual sections of a multi-sectional device, a composite structure can be shaped as desired. In particular, a polymeric composite structure including one or more fluid contact surfaces can be shaped to conform to a predetermined geometry. For instance a large, as-formed composite structure, such as a multilayer film, or a plurality of microtomed, stacked sections of a multilayer film, can be rolled into a spiral, formed into an annular shape, or formed to any other shape as desired for a particular application.

Fluid contacting surfaces of a device, e.g., a surface including one or more functional chemistries for interactive contact with an analyte in a fluid sample or a surface that can form a side or edge of such a section, can be coated with other materials. For example, following shaping of a macroscopic device including a composite structure as described herein, an adhesive can be coated on an outer surface of the device that can be utilized to maintain the desired shape of the device during and following any additional processing, e.g., cutting of the composite into individual sections. Other materials that can be coated onto one or more surfaces of either a large, as formed composite structure, an individual section cut from such a large structure, or a multi-sectional device formed from a plurality of such sections, can include materials that can control flow or wicking characteristics of a fluid across a surface, adsorption/desorption characteristics of a surface, heat transfer characteristics, or the like. For example, a surface of a device can be coated with layers of metal or metal oxides to affect characteristics of the surface.

At least one polymeric material of a composite structure can include a reactive functionality suitable for use in the desired application, e.g., a separation protocol. For instance, in one embodiment, a reactive functionality of a polymer (e.g., acrylic acid, epoxy, etc.) can be used directly in a separation protocol to bind a particular analyte or class of materials that may be found in a fluid sample, for instance perchlorate ion.

In another embodiment, a reactive functionality included on a polymer can be further derivatized with a particular chemistry suitable for a particular application. For example, in one embodiment, a reactive functionality of a polymeric material can be further derivatized via a secondary surface chemistry functionalization to serve as a binding site for an analyte of interest.

In one embodiment, a device can be advantageously utilized in a separation protocol. For instance, a known ligand for a particular analyte of interest, such as a particular biomolecule or a particular chemical agent, for example, can be bound to a polymeric material of a composite structure via the reactive functionality of a polymer of the polymeric material. Suitable ligands for particular materials are generally known to those of skill in the art. For example, when considering development of a protocol designed for separation of a particular antibody from a fluid sample, suitable ligands for that antibody such as haptens particular to that antibody, complete antigens, epitopes of antigens, and the like can be bound to the polymeric material via the reactive functionality of the polymer. For instance, the functional chemistry of a polymeric material of the composite can be derivatized with a specific binding member of a specific binding pair, i.e., two different molecules where one of the molecules chemically and/or physically binds to the second molecule, and the fluid sample can contain the other member of the specific binding pair. Another embodiment could use molecularly imprinted polymers as the binding agent.

Optionally, the ligand utilized in the separation protocol can describe a reversible binding reaction with the analyte of interest. According to this embodiment, following the separation of an analyte from a contacting fluid, the binding reaction between the analyte and the ligand can be reversed, such as by washing the device with a fluid including a material which can contain specific functionality to cleave the analyte from the ligand while also preventing the ligand from reattaching to the analyte. For instance, in one embodiment, an analyte can bind to the flow device via a disulfide bond between the analyte and a ligand. In this embodiment, the disulfide bond may be broken in the presence of a reducing agent. For instance, a reducing agent such as mercaptoethanol can be caused to flow across or otherwise contact the contact surface, and the disulfide bond can be broken. In this embodiment, the analyte can be released from the device, and the ligand can remain on the contact surface to be utilized again in another separation protocol. Other reversible binding protocols are well known to those of skill in the art, and thus have not been presented in detail herein. Reversible binding protocols can be beneficially utilized, for instance, in a concentration protocol, in order to first remove an analyte from a fluid and then obtain the analyte at a higher concentration.

In another embodiment, a flow device can be utilized for directed fluid movement. For example, one or more of the polymeric materials forming the polymeric composite can include hydrophilic or hydrophobic reactivity that can be utilized to direct movement of a fluid over the contact surface of the device. Optionally, the polymeric materials can physically direct fluid movement over the surface, as previously mentioned. For example, a polymeric material can physically deform during formation of the device, for instance due to response to pressure changes when a surface is formed during a cutting or slicing process, upon application of heat to the surface, upon swelling due to preferential absorption of water by a polymeric material, or the like. Deformation of a polymeric material at a surface of the device can form micro- or nano-fluidic flow channels on the contact surface that can direct the fluid flow as desired.

In one embodiment, the device can be a flow device. That is, fluid can be forced to flow over a contact surface of the device. This is not a requirement, however, and in another embodiment, the fluid contact can come about via an immersion process, via a wicking process, or according to any other process that can allow contact between a surface of the device and a fluid (either gaseous or liquid).

In another embodiment, a device can be utilized for directed growth of materials. For example, in one embodiment a catalytic surface chemistry such as a polymerization initiator, a crystallization initiator, or the like, can be created in one or more discrete areas of the contact surface. Accordingly, a material formation reaction (e.g., polymerization, crystal growth, CVD, reduction of bound metal ions, etc.) can be carried out at the surface, with the material formation being controllably directed in those areas of the device that include the growth initiator.

In yet another embodiment, a device can be utilized for directed cell growth. For example, discrete areas of a fluid contact surface can be functionalized to include binding materials for binding entire cells. For example, extra-cellular matrix proteins particular to a certain surface compound of a cell type can be bound to a discrete area of a device via the reactive functionality of the polymeric material forming that area. In another embodiment, non-reactive areas of a surface can guide cell growth. For instance, a first area of the contact surface can include a functional chemistry that is cell resistant, and following contact with a sample including cells (e.g., anchoring cells), the cells can be restricted to anchor at the second area of the contact surface. In either case, the orientation of the growth and development of the bound cellular material can be directed and controlled according to the pattern of the reactive materials that bind the cells including, if desired, according to a gradient of the reactive materials across a single discrete area and/or across the reactive areas when viewed as a whole.

The disclosed subject matter may be better understood with reference to the following examples.

Example 1

A seven-layer film including alternating layers of ethylene-co-acrylic acid) copolymer (EAA) and linear low-density polyethylene (LLDPE) was formed with EAA forming the outer layers. Each layer was approximately 7 micrometers ($\mu$m) thick. The seven layer films were cut into square sections of 1 cm×1 cm. A prescribed number of the square sections were stacked together in a Teflon® mold (3×3×0.15 cm$^3$), which was sandwiched between two Teflon® sheets. Samples were then pressed at 130° C. in a compression press (Carver, model 30-12-2T). All samples were pressed at about 117 kPa for about one minute. The samples were then quenched rapidly to room temperature with cold water. Following quenching, the samples were removed from the mold and dried in a vacuum oven. Initially, 64 sections of the seven layer film were pressed to form a 448-layer film. This sample was then cut into four equal pieces, with one used for analysis. The other three pieces were stacked together and pressed in the same mold. After pressing at the same conditions as above, the polymer films were quenched and dried in a vacuum oven. The multilayer film thus formed was cut into four pieces and the process was repeated. Thus, 1,344- and 4,032-layer films were also obtained.

Ultrathin sections (about 100 μm thick) were prepared using a RMC Powertome X with a cryo system equipped with a diamond knife at −100° C. Images of the contact surface of the multilayered structure were obtained via an AFM imaging technique, shown in FIGS. 4A and 4B.

As can be seen in the figures, the contact surface includes alternating strips of the LLDPE 12 and the EAA 10. Individual strips of the LLDPE 12 (corresponding to the LLDPE layers of the originally formed film) were estimated to be about 4 μm and the individual strips of the EAA 10 (corresponding to the EAA layers of the originally formed film) were estimated to be about 8 μm.

Figures 4A, 4B:
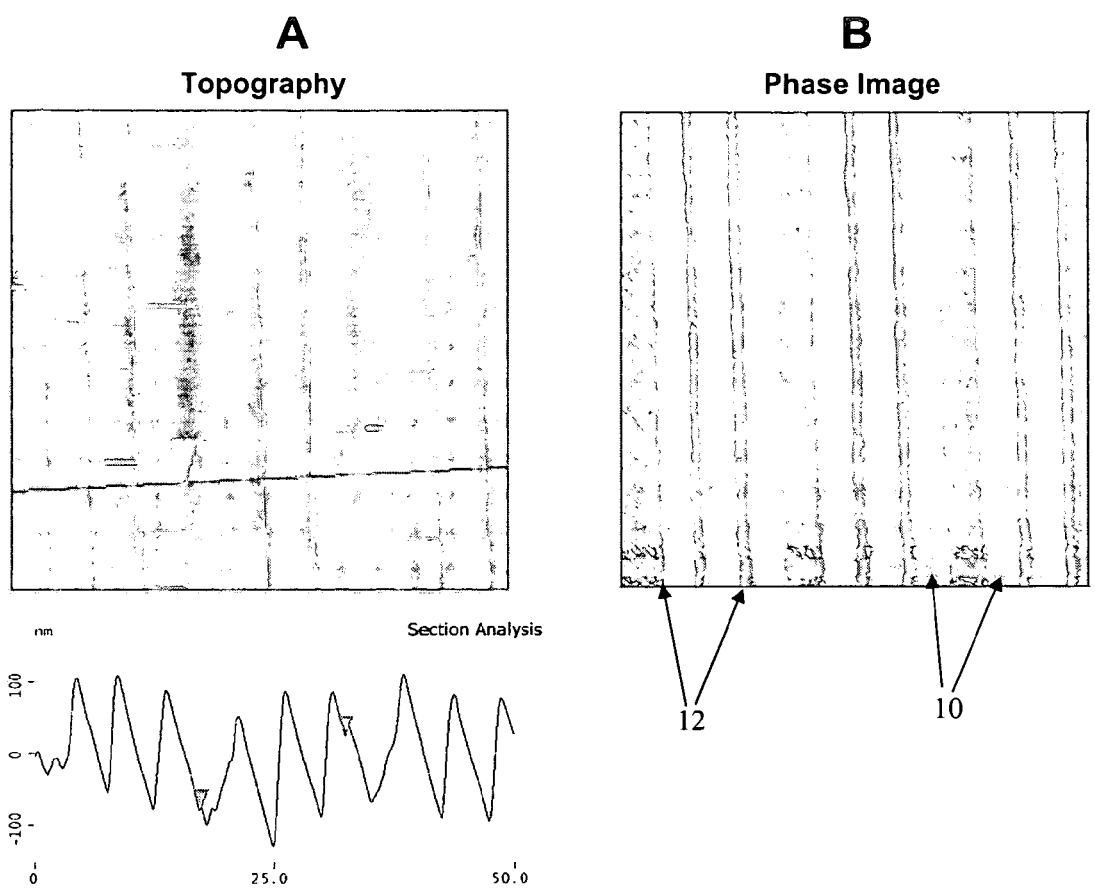
FIGS. 4A and 4B are Atomic Force Microscopy (AFM) images illustrating the topography and phase image of exemplary films as described in the Example section.

FIG. 4A illustrates the surface topography of the contact surface of a 448-layer film. As can be seen, the surface topography deviates somewhat from planar, with the copolymer material strips elevated between approximately 100 nm and 200 nm higher than the homopolymer material strips, forming channels between the strips of the copolymer material. This volume of relations is believed to result from the residual stresses stored in the individual layers when they are extruded and compressed, because LLDPE crystallizes before EAA. The surface topography was found to be stable and no significant change was observed by AFM after the sample was maintained at 60° C. for 24 hours.

The 448-layer films were cyro-ultramicrotomed at approximately −100° C. The polymers at this temperature were glassy. In this case, the surface roughness decreased while the LLDPE was bumped by only about 100 nm above the EAA layers. Relatively flat surfaces were obtained for the 4,032-layer films. When the sample was cryo-ultramicrotomed at −100° C., a layered topography was not as clear as that for the 448-layer specimens.

As can be seen in the phase image FIG. 4B, the two polymeric materials remain in their discrete locations, and the different materials showed good adhesion to one another with no additional adhesive additives included in the composite, either as an additive to the polymeric materials themselves or as an intervening layer between the individual layers.

Example 2

Materials: N-Hydroxysuccinimide (NHS), 1-ethyl-3-(3-dimethylaminopropyl) carbodiimide hydrochloride (EDC), and bovine serum albumin (BSA) were obtained from Aldrich, Phosphate buffered saline (PBS) tablets were obtained from EMD Biosciences, Inc. (+)-Biotinyl-3,6,9-trioxaundecanediamine and Alexa488 labeled streptavidin were purchased from Pierce. All chemicals were used as received.

A 448-layer thin section prepared as described above in Example 1 was rinsed with hexane to remove any residual wax from microtoming and dried in a vacuum oven. The thin section was then immersed in a NHS/EDU ($200\times10^{-3}/100\times10^{-3}$ M) PBS (pH=7.4) solution for 1 hour to activate the carboxylic acid groups on the surface of the EAA layers followed by rinsing with PBS buffer solution. After activation, the sample was immersed in an amine-terminated biotin ligand solution ($10\times10^{-3}$ M in ethanol) for 2 hours and rinsed with ethanol and PBS buffer solution. The sample was then immersed in a solution of fluorescence-conjugated streptavidin (0.1 mg.mL$^{-1}$) in PBS buffer solution with 0.1% (w/v) BSA for another 2 hours. After rinsing several times with PBS buffer solution, the sample was dried in a vacuum oven and examined by fluorescence microscopy. The scheme of the patterned surface generation and subsequent modification is shown below:

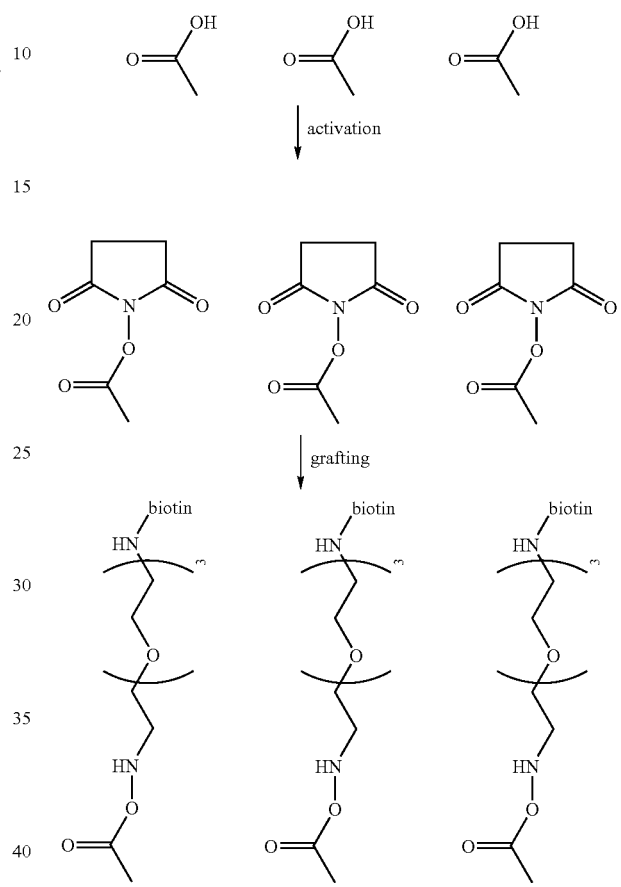

Figure 5:
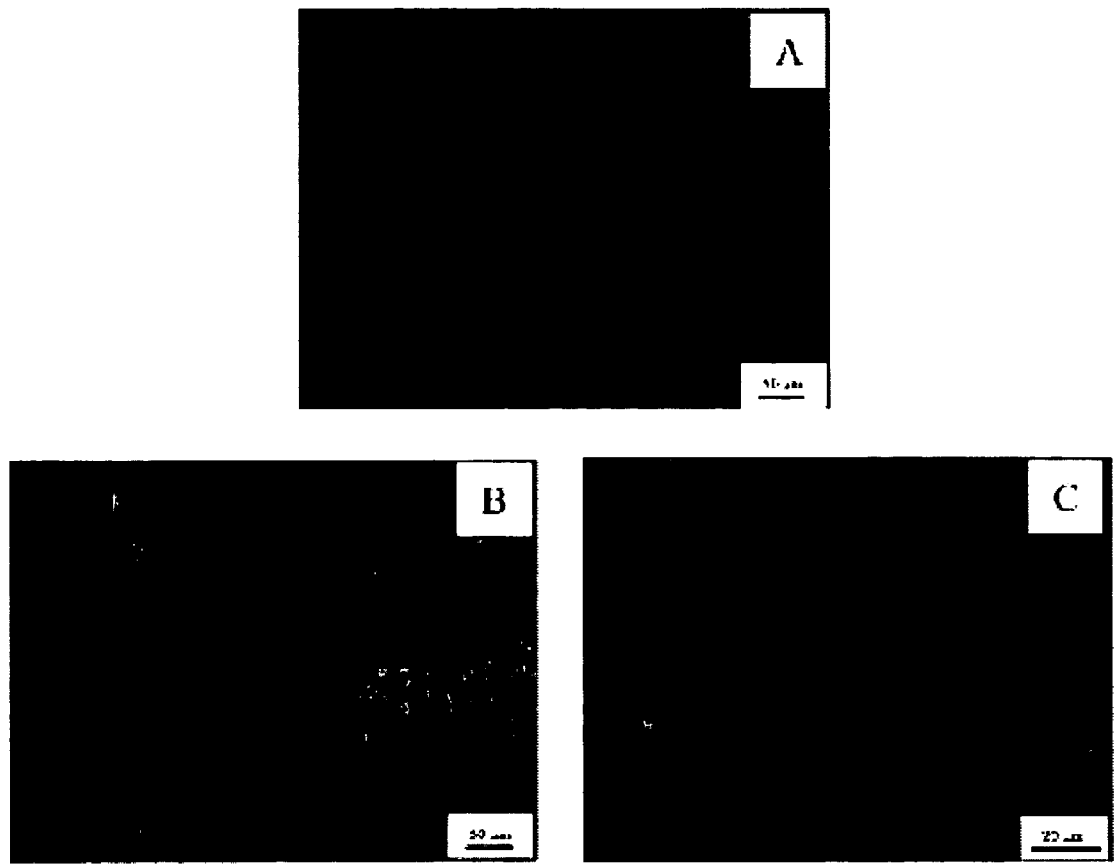
FIGS. 5A-5C are fluorescence images for a control patterned surface (FIG. 5A), and patterned contact surfaces as described herein following functionalization and incubation with a solution including Alex488 conjugated streptavidin.

The modified, patterned surface thus formed was incubated in a solution of fluorescent, conjugated streptavidin (Alexa488). FIGS. 5A-5C show the images taken by fluorescence microscopy. FIGS. 5B and 5C show that the streptavidin was bound primarily on the biotin-modified EAA areas. The specimen in FIG. 5A served as a control in which a neat (non-activated) patterned surface was immersed in the protein solution for a prescribed time, but no significant fluorescence was observed after rinsing, which indicated a low level of non-specific binding, which would occur particularly on the hydrophobic LLDPE layers. To minimize non-specific binding, another polymer, such as poly(ethylene glycol) methacrylate, could be used as the non-reactive layer.

As seen in FIGS. 5B and 5C, the surfaces were not perfect stripes as there was evidence of defects in the fluorescence images. These defects did not come from irregularities in the multilayer structure, however, but primarily from the microtoming process.

It will be appreciated that the foregoing examples, given for purposes of illustration, are not to be construed as limiting the scope of this disclosure. Although only a few exemplary embodiments have been described in detail above, those skilled in the art will readily appreciate that many modifications are possible in the exemplary embodiments without materially departing from the novel teachings and advantages. Accordingly, all such modifications are intended to be included within the scope of this disclosure. Further, it is recognized that many embodiments may be conceived that do not achieve all of the advantages of some embodiments, yet the absence of a particular advantage shall not be construed to necessarily mean that such an embodiment is outside the scope of the present disclosure

What is claimed is:

1. A separation device including a fluid contacting surface, the separation device comprising at least a portion of a multilayer composite structure, the multilayer composite structure including a first polymeric film defining a first edge surface that extends from a facing surface of the first polymeric film to a backing surface of the first polymeric film, the facing surface and the backing surface opposing one another, the first polymeric film comprising a first functional chemistry for directly or indirectly binding a compound, the multilayer composite structure also including a second polymeric film defining a second edge surface that extends from a facing surface of the second polymeric film to a backing surface of the second polymeric film, the facing surface and the backing surface opposing one another, wherein the fluid contacting surface includes the first edge surface and the second edge surface, the first edge surface forming a first discrete area of the fluid contacting surface, and the second edge surface forming a second discrete area of the fluid contacting surface.

2. The separation device of claim 1, wherein the first polymeric film and the second polymeric film are melt processed polymeric films.

3. The separation device of claim 1, the second polymeric film including a second functional chemistry.

4. The separation device of claim 1, wherein the first polymeric film includes a first polymer and the second polymeric film includes a second polymer, wherein a monomeric component of the first polymer is the same as a monomeric component of the second polymer.

5. The separation device of claim 4, wherein the first polymer is a homopolymer and the second polymer is a copolymer.

6. The separation device of claim 1, wherein the first polymeric film is between about 20 and about 500 microns thick as measured from the facing surface to the backing surface.

7. The separation device of claim 1, wherein the backing surface of the first polymeric film is immediately adjacent to the facing surface of the second polymeric film.

8. The separation device of claim 7, the multi-layer composite structure including a plurality of the first polymeric film and a plurality of the second polymeric film.

9. The separation device of claim 8, wherein the plurality of first polymeric films and the plurality of second polymeric films are in an alternating arrangement with one another such that the separation device includes a plurality of first discrete areas, each first discrete area being formed by a first edge surface of a first polymeric film.

10. The separation device of claim 9, wherein the plurality of first discrete areas form a flow pattern for a fluid on the fluid contacting surface.

11. The separation device of claim 1, wherein the multilayer composite structure is flexible.

12. The separation device of claim 1, wherein the separation device comprises a section of the multi-layer composite structure.

13. The separation device of claim 12, wherein the separation device comprises a microtomed section of the multi-layer composite structure.

14. The separation device of claim 12, wherein the separation device comprises multiple sections of the multilayer composite structure in a stacked arrangement.

15. The separation device of claim 1, wherein the functional chemistry is epoxy, acrylate, hydroxyl, carboxyl, amine, amide, sulfide, unsaturated carbon, acid halide, or halogen.

16. The separation device of claim 1, wherein the functional chemistry is a member of a specific binding pair.

17. The separation device of claim 1, wherein the functional chemistry is a polymerization initiator or a crystallization initiator.

18. A method for binding a compound to a surface comprising:
    contacting the fluid contacting surface of the separation device of claim 1 with a fluid comprising the compound; and
    preferentially binding the compound to the fluid contacting surface by direct or indirect binding of the compound to the first functional chemistry of the first discrete area.

19. The method according to claim 18, further comprising flowing the fluid over the fluid contacting surface.

20. The method according to claim 18, wherein the fluid is a gas.

21. The method according to claim 18, wherein the fluid is a liquid.

22. The method according to claim 18, wherein the compound is at the surface of a living cell, the method comprising binding the living cell to the fluid contacting surface.

23. The method according to claim 18, further comprising utilizing a second functional chemistry of the second discrete area to direct the compound to the first discrete area.

24. The method according to claim 18, wherein the binding is reversible.

* * * * *